United States Patent [19]

Grossman et al.

[11] Patent Number: 5,194,282
[45] Date of Patent: Mar. 16, 1993

[54] FOOD PRODUCTS HAVING A REDUCED FAT CONTENT

[75] Inventors: Shlomo Grossman, Ramat Gan; Margalit Bergman, Holon, both of Israel; Abraham I. Bakal, Parsippany; Penny A. Cash, Denville, both of N.J.

[73] Assignee: Bar Ilan University, Ramat Gan, Israel

[21] Appl. No.: 617,555

[22] Filed: Nov. 26, 1990

Related U.S. Application Data

[63] Continuation-in-part of Ser. No. 337,008, Apr. 12, 1987, abandoned.

[51] Int. Cl.$^5$ .............................................. A23L 1/0562
[52] U.S. Cl. ...................................... 426/549; 426/552; 426/657; 426/564; 426/570; 426/804; 426/603; 426/605; 426/576; 530/354; 530/355
[58] Field of Search ............... 426/549, 570, 576, 552, 426/603, 657, 605, 804, 564, 437, 643; 530/354, 355

[56] References Cited

U.S. PATENT DOCUMENTS

| | | | |
|---|---|---|---|
| 1,024,009 | 4/1912 | Kronenberger | 426/581 |
| 2,024,683 | 12/1935 | Epstein | 530/355 |
| 3,510,316 | 5/1970 | Decker | 426/565 |
| 3,787,216 | 1/1974 | Wingerd et al. | 426/570 |
| 3,880,036 | 3/1974 | Gabby et al. | 426/804 |
| 3,928,649 | 12/1975 | Cobb | 426/804 |
| 3,930,052 | 12/1975 | De Brou et al. | 426/590 |
| 3,968,267 | 7/1976 | Ogasa et al. | 426/570 |
| 4,103,037 | 7/1978 | Bodor et al. | 426/576 |
| 4,154,817 | 5/1979 | Tsuchiya et al. | 424/76 |
| 4,292,379 | 10/1981 | Topalian et al. | 426/565 |
| 4,308,294 | 12/1981 | Rispoli et al. | 426/564 |
| 4,341,808 | 7/1982 | Croyle | 426/580 |
| 4,400,405 | 8/1983 | Morley et al. | 426/804 |
| 4,416,905 | 11/1983 | Lundstedt et al. | 426/583 |
| 4,435,439 | 3/1984 | Morris | 426/565 |
| 4,451,491 | 5/1984 | Trop et al. | 426/555 |
| 4,510,166 | 4/1985 | Lenchin et al. | 426/565 |
| 4,578,276 | 3/1986 | Morley | 426/586 |
| 4,578,278 | 3/1986 | Giddey et al. | 426/589 |
| 4,734,287 | 3/1988 | Singer et al. | 426/41 |

FOREIGN PATENT DOCUMENTS 297690 7/1987 European Pat. Off. .
235635 6/1925 United Kingdom .

OTHER PUBLICATIONS

Kernot and Speer (Dept. Sci. Ind. Research) 2nd Report of Adhesive Research Committee, 1926, pp. 23-33.

Primary Examiner—Joseph Golian
Assistant Examiner—Evan Federman
Attorney, Agent, or Firm—Nixon & Vanderhye

[57] ABSTRACT

At least part of the fat in fat-containing manufactured food products is replaced by gelatin in an amount by weight which is generally no more than 10% of the weight of the original fat content which has been replaced. Suitable gelatin for this purpose may be made from fish waste comprising fish skins by an aqueous extraction process, such as e.g. a stepwise process including separate alkaline, mineral acid and organic acid treatment steps. The gelatin is said to mimic the sensation experienced by the consumer of the creaminess or richness of foodstuffs containing regular fat levels. Exemplary products to which the invention may be applied are baked goods, dressings, whipped toppings, frostings, cream fillings and spreads. In Examples, the fat content is thus reduced substantially, to give food products which closely resemble in quality the higher fat-containing analogs.

21 Claims, No Drawings

FOOD PRODUCTS HAVING A REDUCED FAT CONTENT

The present application is filed as a continuation-in-part application of patent application Ser. No. 07/337,008 (now abandoned) which was originally filed Apr. 12, 1989.

FIELD AND BACKGROUND OF THE INVENTION

The present invention relates to food products having a reduced fat content. The consumption of fats in manufactured food products, especially in western-type developed countries is generally considered to be excessive. This high fat consumption has been linked to several diseases including atherosclerosis. Several health organizations such as the American Heart Association and the American Dietetic Association have recommended that fat consumption should be reduced to no more than 30% of the ingested calories. However, the incorporation of fats into manufactured food products provides the consumer with a sensation of creaminess or richness associated with high quality foods, so that reducing the fat content tends to a significant reduction in consumer acceptance. Foods which are normally rich in fat are baked goods (cakes, cookies and the like), dressings such as mayonnaise, whipped toppings, frostings, cream fillings, frozen desserts and spreads.

Attempts to reduce the fat contents of such food products have been partially successful through the use of such products as gums, milk and whey proteins and low D.E. maltodextrins. However, these ingredients yield products which are somewhat less creamy than their full-fat counterparts. Additionally, proposed solutions of the fat-replacement problem in the prior art have encountered various problems such as lack of stability of the product, and undue expense in production.

U.S. Pat. No. 4,308,294 (Rispoli et al) discloses a multistep process for preparing an oil replacement composition which includes as essential ingredients protein (such as egg protein, soy protein, whey protein and casein), cellulose gum, acid and an acid stable modified starch, in specified proportions. The composition is used in French dressing, margarine and imitation ice cream.

U.S. Pat. No. 4,510,166 (Lenchin et al) utilizes as fat and/or oil substitutes in foodstuffs, converted gelling starches having a dextrose equivalent less than 5 and specified viscosity and gelling characteristics. The products appeared to be of particular utility in foodstuffs such as ice cream, mayonnaise and toppings, but attempts to incorporate them in margarine do not seem to have been markedly successful. Moreover, in absence of indications to the contrary, it would be expected that a starch-derived product would either undesirably increase the calorific value of the product, or at least, not decrease the calorific value in a desirable manner.

U.S. Pat. No. 4,734,287 discloses a proteinaceous, water-dispersible macrocolloid comprising substantially nonaggregated particles of denatured dairy whey protein, which is proposed for use as a fat substitute. The whey protein necessarily has in the dry state a mean diameter particle size distribution of 0.1–2.0 microns, with less than 2% of the particles exceeding 3.0 microns, the majority of the particles being substantially spheroidal, when viewed at about 800 power magnification under a standard light microscope. The product of this patent is used principally in mayonnaises and sandwich spreads. The main disadvantages of this product are the exacting particle size standards, which make for expense in the manufacturing process, and—since the particles coalesce during storage—its relatively short life.

It is evident that all of these prior art products find their main utility in foodstuffs which are not exposed to heat. Accordingly, a need exists for low-calorie fat substitutes which mimic the sensation experienced by the consumer of the creaminess or richness of foodstuffs containing the regular fat levels, which are relatively inexpensive to manufacture and which are stable for the life of the end-product. The term "fat substitutes" in the present context is intended to relate on the one hand to the partial or total replacement, in general, of fat or oil in a foodstuff containing a relatively high content of such ingredient, and on the other hand to provide a partial or substantially complete replacement for fat or oil in foodstuffs which are usually low in fat or oil content, so as to increase the creamy mouthfeel and hence the consumer acceptance of such foodstuffs.

It is an object of the present invention to provide food products containing a low-calorie fat substitute which mimics the sensation experienced by the consumer of the creaminess or richness of foodstuffs containing the regular fat levels.

A further object of the invention is to provide food products containing such fat substitutes which are relatively inexpensive to manufacture and which are stable for the life of the end-product.

Another object of the invention relates to the use of gelatin and particularly fish-derived gelatin as the fat substitute just referred to.

A particular object of the invention provides food products in which a low-calorie fat substitute is a high quality gelatin produced from fish skins by the low energy consuming process of patent application Ser. No. 07/338,595, which is referred to described hereinbelow.

A further object of the invention is to provide foodstuffs including a gelatin product which will be suitable for consumers who wish to avoid the bovine and/or porcine gelatins.

Another object of the invention is to provide a normally fat-containing manufactured food product, in which at least part of the fat content therein is replaced by gelatin in an amount which is less (even much less), weight for weight, than the fat being replaced.

Yet other objects of the invention will appear from the description which follows.

SUMMARY OF THE INVENTION

The present invention accordingly provides a normally fat-containing manufactured food product wherein at least part (and possibly all) of the fat content therein has been replaced by gelatin in an amount by weight which is no more than 10% (and preferably no more than 7.5%), of the weight of the original fat content which has been replaced; provided that when the food product is a frozen dessert, then unless the original fat content thereof has been totally replaced by gelatin, the gelatin amounts to no more than 4% (and preferably no more than 2.5%), of the weight of the original fat content which has been replaced.

For purposes of definition, in the present specification and claims, reference to fats includes oils, where the context permits, while the expression "normally fat-containing" is intended to refer to manufactured foods in which no attempt has been made to reduce the traditional amounts of fat therein, by use of fat substitutes.

DETAILED DESCRIPTION OF THE INVENTION

In a particular embodiment, when in a normally fat-containing food product, at least 75% and up to 100% by weight of the original fat content has been replaced by gelatin in accordance with the invention, then the mount of gelatin present may be within the range of from 0.05 to 1.2 (preferably from 0.2 to 1.0) wt.%, based on the entire product.

In a different particular embodiment, when in a normally fat-containing food product, at least 50% but less than 75% by weight of the original fat content has been replaced by gelatin in accordance with the invention, then the amount of gelatin present may be within the range of from 0.05 to 1.0 (preferably from 0.1 to 0.7) wt.%, based on the entire product.

It is preferred that the gelatin used for fat replacement in accordance with the present invention is a fish-derived gelatin, particularly gelatin which is made from fish waste comprising fish skins by a stepwise process including a step of aqueous extraction preceded by separate alkaline, mineral acid and organic acid treatment steps.

The gelatin utilized in accordance with the present invention preferably has a Bloom value of at least 200, more preferably at least 250.

In a particular embodiment, a food product according to the present invention may comprise, based on the entire product, from 0 to 3 wt.% fat, between 0.05 and 3 (preferably from 0.05 to 1.0, e.g. from 0.1 to 0.7) wt.% gelatin, balance other ingredients.

Without detracting from the generality of the invention as set forth herein, a food product in accordance therewith may, by way of non-limiting example, be selected from one of the following products labelled (A), (B), (C) and (D), namely:

(A) a mayonnaise-type dressing which comprises, based on the entire product, from 0 to 40 wt.% fat, from 0.1 to 0.7 wt.% gelatin, balance other ingredients;

(B) a baked goods pre-baking mix (in particular, a batter) which comprises, based on the entire product, from 0 to 6.5 wt.% fat, from 0.1 to 0.7 wt.% gelatin, balance other ingredients;

(C) a margarine-type spread which comprises, based on the entire product, from 5 to 20 wt.% fat, from 0.1 to 0.7 wt.% gelatin, balance other ingredients; and (D) a whipped topping which comprises, based on the entire product, from 0 to 10 wt.% fat, from 0.1 to 0.7 wt.% gelatin, balance other ingredients.

As has been already indicated, the present invention includes the embodiment in which all of the fat content in a normally fat-containing manufactured food product has been replaced by gelatin.

The person skilled in the art will be readily able to determine the amount in wt.% terms by which the fat content of a particular product may be reduced, when using gelatin to replace fat in particular manufactured food products.

It has moreover been found that the preferred use of fish-derived gelatin in the present context affords the consumer an even better creaminess or richness sensation in the mouth, than when gelatin from other sources is used. Gelatin is a water-soluble proteinaceous substance which finds extensive use in the food and other industries. It is derived from the breakdown of collagen, a substance of similar composition which is however insoluble, the source of the collagen traditionally being preponderantly animal bones, hide pieces and pork-skins.

It has been known for many years that gelatin may also be obtained from fish waste, e.g. from fish skins and other fish offal. Since such waste is available in large quantities from fish canning operations, it would appear to be potentially useful to use it for gelatin production, provided that a technically and economically viable process of manufacture could be found. Part of the technical difficulty concerns the elimination of the unpleasant smell often associated with fish products. It is surprising that, so far as is known, gelatin from fish waste sources has not found widespread application in the food industry, up to the present time. In accordance with the present invention, however, fish gelatin, and more particularly the fish gelatin made by the process of commonly assigned copending U.S. application Ser. No. 07/338,595, filed on the same date as the parent application Ser. No. 07/337,008, based on and deriving priority from Israel Patent Application No. 87344 as originally filed Aug. 4, 1988, is especially useful in replacing at least part of the fat content of manufactured food products. The entire disclosure of U.S.S.N. 07/338,595 is incorporated herein by reference.

Looking at the matter from a different point of view, it may be appreciated that in addition to the fact that a cheap source material exists, the use of fish gelatin in food products in accordance with the present invention would possess the further advantage that it will be acceptable to large segments of the population which, whether for religious, health or merely aesthetic reasons would want to avoid eating products derived from the higher animals.

The effective level of gelatin giving the desired effect depends to a large extend on the particular food product in which it is incorporated, but preferred ranges of this ingredient in accordance with the invention have otherwise been indicated elsewhere herein.

It is presently preferred that the gelatin incorporated in manufactured food products as a fat substitute, in accordance with the present invention, is produced from fish skins by a multistep process which comprises the steps of:

(a) cleaning the skins in order to remove therefrom substantially all superfluous material;

(b) treating the cleaned skins with dilute aqueous alkali;

(c) washing the alkali-treated skins with water until the washing water is substantially neutral;

(d) treating the thus-neutralized skins with dilute aqueous mineral acid;

(e) washing the mineral acid-treated skins with water until the washing water is substantially neutral;

(f) treating the thus-neutralized skins with dilute aqueous citric acid;

(g) washing the citric acid-treated skins with water until the washing water is substantially neutral;

(h) extracting with water at elevated temperatures not above about 55° C., the washed citric acid-treated skins; and (i) optionally removing the water to obtain from the thusproduced aqueous gelatin solution, gelatin in the solid state.

The superfluous material referred to in step (a) means fat, flesh, bones, scale and so forth. Step (a) may be carried out, for example, by washing with excess water, conveniently under pressure. Prior to step (b), the fish skins are optionally macerated or cut into pieces, though this is not essential. In step (b), the alkali is conveniently sodium hydroxide, but potassium hydroxide, sodium carbonate or potassium carbonate could also be used. The use of a mineral acid in step (d) may be regarded as somewhat surprising, since Kernot and Speer (D.S.I.R. 2nd report of the Adhesives Research Committee, 1926, pages 23-33, see also GB 235635, which disclosures are incorporated herein by reference) used the weak acid sulfurous acid, and implied that use of a mineral acid such as HCl is likely to give a glue rather than gelatin. In the multistep process described above, the presently preferred mineral acid is sulfuric acid, but may alternatively be e.g. HCl.

According to such process, there is included a citric acid treatment step (f), in addition to the mineral acid treatment step. While the reason for the efficacy of citric acid is not known, it was found by to be more efficient in giving a high quality product, than when using mineral acid only. It is believed that other organic acids which are acceptable in food processing and which do not possess or impart an offensive odor, such as for example ascorbic, fumaric, malic, succinic and tartaric acids, could be substituted for at least part of the citric acid in step (f) of the process. The washing steps (c), (e) and (g) are carried out in the manner well known in the art, the washings being tested for neutrality and the washing steps being terminated when neutrality is established.

Compared with the prior art, the stepwise process employs much lower temperatures for the treatment steps, which besides being economical in terms of energy, result in a high quality product. Although Kernot and Speer asserted that if care is taken, their method can result in "an almost pure gelatin . . . entirely free from taste or odor", it was found that carrying out gelatin preparations according to their instructions invariably resulted in a poor quality product with a strong fishy smell.

It is preferred that steps (a) to (g) are each effected at ambient temperature ±10° C., desirably at a temperature within the range of about 15° to about 27° C., while step (h) is preferably effected at a temperature within the range of about 40° to about 50° C. As regards the concentrations of the treatment agents in steps (b) and (d), the respective treatments may, e.g., be effected using aqueous alkali and mineral acid having concentrations thereof within the range of about 0.05 to about 0.3% wt./vol. In step (f), there may, e.g., be used aqueous citric acid having a concentration thereof within the range of about 0.5 to about 6.0% wt./vol.

If desired, after washing step (g) and prior to extracting step (h), the skins may be washed with distilled water or substantially ion-free water, in order to remove any residual salts. The removal of water in optional step (i) may be carried out by any means known to the art, e.g. by simple evaporation, either at near ambient or at elevated temperatures, or by blowing air over the solution, or by freeze-drying. It is presently contemplated that fish skins derived from any commercially available fish could be used in the present process, the main consideration being availability. However, the presently preferred fish skins are those from Tilapia.

The preferred process for preparing the fish-derived gelatin will now be illustrated by a non-limiting Preparation, followed by a number of Comparative Experiments. It should be noted that Bloom number is an indication of the strength of gels produce. The higher the Bloom number, the stronger the gel.

PREPARATION 50 g. of skins from Tilapia were throughly cleaned with excess water to remove superfluous material, and then soaked in 3×700 ml. 0.2% (wt./vol.) aqueous sodium hydroxide solution, each soaking 40 minutes, total alkali treatment 2 hours. The alkali-treated skins were washed with water until the washings had pH about 7, and were then soaked in 3×700 ml. 0.2% (wt./vol.) aqueous sulfuric acid solution, each soaking 40 minutes, total mineral acid treatment 2 hours. The mineral acid-treated skins were washed with water until the washing had pH about 7, and were then soaked in 3×700 ml. 1.0% (wt./vol.) aqueous citric acid solution, each soaking 40 minutes, total citric acid treatment 2 hours. The citric acid-treated skins were washed with water until the washings had pH about 7, and were then subjected to a final wash with distilled water to remove any residual salts.

The thus-treated skins were placed in a vessel containing distilled water controlled at a temperature within the range of 40°-50° C. Following overnight extraction in this manner, the mixture was filtered, centrifuged and then lyophilized until a powder was obtained; the yield was about 7.5 g. A 5% solution was found to have a similar gelling capacity as a similar solution of a commercial gelatin derived from animal sources and marketed in Israel under the trade name "Ardi". The product of this Preparation was found to have the following properties.

| | |
|---|---|
| APPEARANCE: | Excellent, water white, light textured material. |
| ODOR: | Bland to very slight amine odor. |
| CLARITY: | Excellent. |
| BLOOM (g.): | 263 (determined by a modified procedure due to small quantity, but considered accurate). |
| VISCOSITY (MP): | 51.0 (determined at 6⅔% and 60° C., standard Davis Gelatine Test Method). |
| ASH (%): | 0.    pH: 3.77.    pI: 7.38. |

The following Table compares the amino acid distribution (expressed as wt.%) in the protein content of gelatin obtained in accordance with the process particularly described herein, with gelatin obtained from pigskin. Among the evident differences between the two cases, the greater hydroxyproline content of the gelatin preferably utilized in the present invention may be especially noted.

TABLE

| | AMINO ACID ANALYSIS | |
|---|---|---|
| | SOURCE OF GELATIN | |
| AMINO ACID | Tilapia* | Pigskin |
| Aspartic acid | 5.29 | 4.58 |
| Threonine | 2.55 | 1.79 |
| Serine | 3.12 | 3.47 |
| Glutamic acid | 8.85 | 7.21 |
| Alanine | 9.27 | 11.17 |
| Cystine | — | — |
| Valine | 1.32 | 2.59 |
| Methionine | 1.23 | 0.36 |
| Isoleucine | 1.07 | 0.95 |

TABLE-continued
AMINO ACID ANALYSIS

| AMINO ACID | SOURCE OF GELATIN | |
|---|---|---|
| | Tilapia* | Pigskin |
| Leucine | 2.56 | 2.40 |
| Tyrosine | 0.72 | 0.26 |
| Phenylalanine | 1.97 | 1.36 |
| Histidine | 1.01 | 0.40 |
| Hydroxylysine | 1.27 | 0.64 |
| Ornithine | 0.04 | — |
| Lysine | 3.54 | 2.66 |
| Ammonia | 1.61 | — |
| Arginine | 8.78 | 4.90 |
| Hydroxyproline | 10.31 | 9.07 |
| Proline | 15.05 | 13.19 |
| Glycine | 20.40 | 33.00 |

*product of the above PREPARATION

COMPARATIVE EXPERIMENT A

The method of Kernot and Speer (loc cit) was employed, using 24 hour incubations with alkali and acid, and extraction at 60°-80° C. The product has a Bloom value of 63 or less and a strong fishy odor.

COMPARATIVE EXPERIMENT B

Repeating the conditions of the above Preparation, except that the extraction was carried out at above 55° C., resulted in a product having a Bloom value of less than 60.

COMPARATIVE EXPERIMENT C

Repeating the conditions of the above Preparation, except that the citric acid step was omitted and substituted by absorption on silica, hydroxyapatite or DEAE-cellulose, in an attempt to remove the odor, resulted in a product having a low Bloom value, and from which the odor had not been removed.

COMPARATIVE EXPERIMENT D

Repeating the conditions of the above Preparation, except that the citric acid step was omitted and substituted by extraction with 1:1 paraffins:benzene, resulted in a product from which the odor had been almost entirely removed, but in which the Bloom value had undesirably decreased.

The food product of the present invention will be illustrated by the following non-limitative Examples.

EXAMPLE I

Mayonnaise normally contains 80% oil; it is spreadable and provides a sensation in the mouth of richness and creaminess. A mayonnaise-like dressing was prepared having only 30% oil by weight, having the following formulation (wt.%):

| | Control | Inventive Example |
|---|---|---|
| Water | 44.05 | 44.05 |
| Oil | 30.25 | 30.00 |
| Vinegar (50 grain) | 14.00 | 14.00 |
| Starch (modified) | 4.50 | 4.50 |
| Egg yolk powder | 4.00 | 4.00 |
| Flavors and preservatives | 3.20 | 3.20 |
| Gelatin | — | 0.25 | the gelatin was first dissolved in hot water. The product was prepared by blending all dry ingredients except the yolk. The powder was added to water and mixed in a Hobart mixer. The emulsion was heated to 160° F., then cooled to 70° F. Egg yolk and gelatin were added and the mixture was well stirred. Oil was added slowly while mixing, followed by the vinegar.

Two gelatin samples having approximately the same bloom were evaluated, one from fish prepared according to the stepwise process described herein and the other a commercial product from a non-fish source. The samples were evaluated for creaminess, sensation in the mouth and texture by a panel of judges. The results indicated that the product containing the fish-derived gelatin was rated the creamiest and its texture and mouth-feel sensation was similar to full-fat mayonnaise. Samples made with the non-fish gelatin were lighter in texture and less creamy.

Samples containing the fish-derived gelatin were stored for a period of up to three months at room temperature without noticeable change.

In the foregoing inventive Example, 0.25 wt.% gelatin was substituted for 50 wt.% of the 80 wt.% of oil normally present in mayonnaise, i.e. the gelatin replacement amounted to $0.25 \times 100/50 = 0.5$ wt.% of the replaced oil.

EXAMPLE II

Reduced fat chocolate cake was prepared containing fish-derived gelatin prepared according to the stepwise process described herein, and compared with the full fat product. For further comparison a reduced fat cake was also prepared containing low DE maltodextrin (N-Oil from national Starch Company). N-Oil is believed to be a product within the scope of the aforementioned U.S. Pat. No. 4,510,166. The formulations of the inventive and comparative fat-substitute were as follows:

| | Control | Inventive Example | With N-Oil |
|---|---|---|---|
| Water | 29.35 | 38.50 | 38.50 |
| Granulated sugar | 23.00 | 23.00 | 23.00 |
| Shortening | 12.80 | 3.20 | 3.20 |
| Cake flour | 23.00 | 23.00 | 23.00 |
| Whole egg powder | 4.25 | 4.25 | 4.25 |
| Cocoa | 3.50 | 3.50 | 3.50 |
| Whole milk powder | 2.00 | 2.00 | 2.00 |
| Baking soda & powder | 1.05 | 1.05 | 1.05 |
| Flavor | 0.70 | 0.70 | 0.70 |
| Salt | 0.35 | 0.35 | 0.35 |
| Gelatin | — | 0.40 | — |
| N-Oil | — | — | 0.40 |

The batter was baked at 350° F. for 25 minutes and the cakes were evaluated for texture, general appearance and sensation in the mouth. Results indicated that the cake with the fish-derived gelatin had slightly lower volume than the control, but was similar thereto in grain and crumb structure. The cake was judged similar to control in all other attributes. By comparison, the cake containing N-Oil had significantly lower volume, was denser and chewier than the control. This cake was characterized by the panel as "bready" in texture.

In the foregoing inventive Example, 0.4 wt.% gelatin was substituted for 9.6 wt.% of the 12.8 wt.% of shortening normally present in the cake mix, i.e. the gelatin replacement amounted to $0.4 \times 100/9.6 = 4.2$ wt.% of the replaced shortening.

EXAMPLE III

Whipped toppings generally contain a high percentage of fat, characteristically about 20% by weight. Reduced fat toppings were produced according to the following formulations:

|  | Control (50% Less Fat) | Containing Fish Gelatin | Containing Other Gelatin |
|---|---|---|---|
| Water | 73.05 | 73.05 | 73.05 |
| Hydrogenated fat | 10.00 | 10.00 | 10.00 |
| Hydrol 92 | 5.00 | 5.00 | 5.00 |
| Granulated sugar | 6.00 | 6.00 | 6.00 |
| Sodium caseinate | 3.00 | 3.00 | 3.00 |
| Corn syrup solids 24DE | 2.00 | 2.00 | 2.00 |
| Carboxymethyl-cellulose | 0.50 | 0.50 | 0.50 |
| Emulsifiers | 0.45 | 0.45 | 0.45 |
| Fish gelatin | — | 0.50 | — |
| 250 Bloom gelatin (non-fish) | — | — | 0.50 |

Procedure. The dry ingredients were combined and added to the water using Virtis. The fats and emulsifiers were combined and melted using a hot water bath, and then mixed with the combination of dry ingredients with water. The mixture was heated to 170° F. and homogenized, cooled to 40° F., and whipped in a Hobart mixer at speed 2 for five minutes.

The panel chose the sample with fish gelatin as having the best peak retention and the best heavy creamy and full fat sensation in the mouth. The other two products did not retain the peak and produced a watery sensation in the mouth.

In the foregoing inventive Example, 0.5 wt.% gelatin was substituted for 10 wt.% of the 20 wt.% of hydrogenated fat normally present in the cake mix, i.e. the gelatin replacement amounted to $0.5 \times 100/10 = 5.0$ wt.% of the replaced fat.

EXAMPLE IV

Mayonnaise normally contains 80% oil; it is spreadable and provides a sensation in the mouth of richness and creaminess. With increased interest in foods with lower fat content, several commercial products, labelled as "light mayonnaise" are currently available in the market place. These products typically contain between 50 and 30% oil, while an increased amount of water replaces the oil. Modified starches, starches and/or gums are used to thicken the product and to give it a consistency similar to that of mayonnaise containing the normal amount of oil. Attempts to make mayonnaise with a still lower oil content (or with no oil at all) have not been successful, insofar as the products become stringy or slimy, gummy in texture and generally unstable. An oil-free mayonnaise was prepared according to the following formulation (wt.%):

|  | Control | Inventive Example |
|---|---|---|
| Water | 73.7 | 73.2 |
| Vinegar (50 grain) | 13.0 | 13.0 |
| Starch (modified) | 4.5 | 4.5 |
| Egg yolk powder | 2.5 | 2.5 |
| Gums | 1.7 | 1.7 |
| Flavors (including salt, sugar and mustard flour) | 4.4 | 4.4 |
| Preservatives (EDTA, potassium sorbate and sodium benzoate) | 0.2 | 0.2 |
| Fish gelatin | — | 0.5 |

The control, which contained no gelatin, was gummy and had a watery mouthfeel without the creaminess and richness associated with a typical full-oil mayonnaise.

The oil-free mayonnaise of the invention was made as follows. Fish gelatin, prepared as described herein, was first dissolved in hot water. The product was prepared by blending all dry ingredients except the yolk. The powder was added to water and mixed in a Hobart mixer. The emulsion was heated to 160° C., then cooled to 70° F. Egg yolk and the gelatin solution were added and the mixture was well stirred. Vinegar was added slowly while mixing. The resulting oil-free mayonnaise containing fish gelatin was evaluated by an expert taste panel and was judged as having a creamy, rich mouthfeel without the attendant gumminess observed in the gelatin-free product. The oil-free mayonnaise containing fish gelatin was also more stable than the control.

In the foregoing inventive Example, 0.5 wt.% gelatin was substituted for the total 80 wt.% of oil normally present in mayonnaise, i.e. the gelatin replacement amounted to $0.5 \times 100/80 = 0.63$ wt.% of the replaced oil.

EXAMPLE V

A reduced oil mayonnaise was prepared as described in Example I, but in accordance with the following formulation (wt.%):

|  | Control | Inventive Example |
|---|---|---|
| Water | 64.0 | 63.65 |
| Oil | 10.0 | 10.0 |
| Vinegar (50 grain) | 13.0 | 13.0 |
| Starch (modified) | 4.5 | 4.5 |
| Egg yolk powder | 2.5 | 2.5 |
| Gums | 0.7 | 0.7 |
| Flavors | 5.1 | 5.1 |
| Preservatives | 0.2 | 0.2 |
| Fish gelatin | — | 0.35 |

The control, which contained no gelatin, was gummy and had a watery mouthfeel without the creaminess and richness associated with a typical full-oil mayonnaise, whereas the mayonnaise of the inventive example was judges as having creaminess and richness, approximating a full-oil mayonnaise.

In the foregoing inventive Example, 0.35 wt.% gelatin was substituted for 70 wt.% of the total 80 wt.% of oil normally present in mayonnaise, i.e. the gelatin replacement amounted to $0.35 \times 100/70 = 0.5$ wt.% of the replaced oil.

EXAMPLE VI

Yellow cake was prepared from the following formulation:

|  | Control* | Control | Inventive Example |
|---|---|---|---|
| Water | 32.1 | 37.1 | 36.5 |
| Sugar | 26.0 | 30.00 | 30.0 |
| Shortening | 12.0 | — | — |
| Cake flour | 21.0 | 24.0 | 24.0 |
| Whole egg powder | 1.5 | 1.5 | 1.5 |
| Non-fat milk solids | 4.0 | 4.0 | 4.0 |
| Leavening powder | 1.0 | 1.0 | 1.0 |
| Flavors | 0.9 | 0.9 | 0.9 |
| Emulsifiers | 1.5 | 1.5 | 1.5 |
| Fish Gelatin | — | — | 0.6 |

*typical formulation containing 12.0% fat contained neither fat nor gelatin

The batter was baked similarly to Example II and the cakes were evaluated by a taste panel for tenderness and crumb characteristics. The cake of the inventive example was judged as having the crumb characteristics of the full fat product (control*) with tender/moist texture. Control, without gelatin, was judged as having a gummy and a dense crumb texture, and had significantly lower overall quality than both control* and the cake according to the invention.

An important measure of cake quality is the volume of the cake which represents the degree of aeration and the crumb structure. In this respect, the control* cake had a volume of approximately 385–390 cc, the cake of the invention a volume of approximately 375–380 cc and the control* cake a volume of approximately 355–360 cc. Thus, the addition of a gelatin in accordance with the invention, even in relatively small quantities, allows the production of high quality fat-free cakes.

In the foregoing inventive Example, 0.6 wt.% gelatin was substituted for the total 12.0 wt.% of shortening normally present in the cake mix, i.e. the gelatin replacement amounted to $0.6 \times 100/12.0 = 5.0$ wt.% of the replaced shortening.

EXAMPLE VII

A very low fat margarine-like spread was prepared using the following formulation and procedure:

|  | Control** | Control♦♦ | Inventive Example |
|---|---|---|---|
| Water | 58.2 | 87.2 | 86.7 |
| Fat (partially hydrogenated) | 39.2 | 10.0 | 10.0 |
| Colors and flavors | 0.2 | 0.2 | 0.2 |
| Emulsifiers | 0.8 | 1.0 | 1.0 |
| Salt | 1.6 | 1.6 | 1.6 |
| Fish Gelatin | — | — | 0.5 |

**typical formulation containing 39.2% fat
♦♦contained neither 10.0% fat but no gelatin These products were prepared by combining the oil phase ingredients (fat, emulsifiers) first and heating this phase to 110°–120° F. The two phases are combined by gradually adding the water phase to the oil phase while continually mixing and cooling the emulsion to about 60° F. Control** represents a typical, low-fat, margarine-like spread containing about 40wt.% fat; it is a water-in-oil emulsion and is stable under refrigeration. Control♦♦ and the spread of the invention, both containing 10 wt.% fat, are mixed emulsions, i.e. water-in-oil-+oil-in-water. The inventive spread is a stable product, whereas control♦♦ is an unstable emulsion which breaks up within one week of storage in the refrigerator.

Penetrometer data, reflecting gel strength, indicates that the spread of the invention had a value of 110 mm, very close to the value of 115 mm. for control**. Control♦♦ was significantly softer (70 mm.)

The spread of the invention and control** had a similar performance during frying (degree of splattering), cold spreadability and melting characteristics on hot foods such as hot potatoes, and exhibited no phase separation or syneresis, in storage. Control♦♦, on the other hand, exhibited violent splattering, phase separation during cold spreading and syneresis during storage.

In the foregoing inventive Example, 0.5 wt.% gelatin was substituted for 29.2 wt.% of the total 39.2 wt.% of fat normally present in this type of margarine, i.e. the gelatin replacement amounted to $0.5 \times 100/29.2 = 1.7$ wt.% of the replaced fat.

While the invention has been particularly described with respect to certain specified embodiments, it will be evident to those skilled in the art that many variations and modifications are possible. Accordingly, the invention is not to be construed as limited such embodiments, rather its concept, spirit and scope will be understood in the light of the claims which follow.

We claim:

1. A normally fat-containing manufactured food product, wherein at least part of the fat content therein has been replaced by gelatin in an amount by weight which is no more than 10% of the weight of the original fat content which has been replaced, and wherein the gelatin is a fish-derived gelatin made from fish waste comprising fish skins by a stepwise process including the following steps (i), (ii), (iii) and (iv) carried out in the recited sequence, namely:

(i) treating said fish waste with dilute aqueous alkali, followed by washing with water until the washing water is substantially neutral;

(ii) treating the alkali-treated and washed fish waste from step (i) with dilute aqueous mineral acid, followed by washing with water until the washing water is substantially neutral;

(iii) treating the mineral acid-treated and washed fish waste from step (ii) with dilute aqueous organic acid, followed by washing with water until the washing water is substantially neutral; and (iv) extracting with water at elevated temperatures not above about 55° C., the organic acid-treated and washed fish waste from step (iii).

2. A food product according to claim 1, wherein at least 75% by weight of the original fat content has been replaced, and which product contains gelatin in an amount which lies within the range of from 0.05 to 1.2 wt.%, based on the entire product.

3. A food product according to claim 2, which contains gelatin in an amount which lies within the range of from 0.2 to 1.0 wt.%, based on the entire product.

4. A food product according to claim 1, wherein at least 50% but less than 75% by weight of the original fat content has been replaced, and which product contains gelatin in an amount which lies within the range of from 0.05 to 1.0 wt.%, based on the entire product.

5. A food product according to claim 4, which contains gelatin in an amount which lies within the range of from 0.1 to 0.7 wt.%, based on the entire product.

6. A food product according to claim 1, wherein said gelatin has a Bloom value of at least 200.

7. A food product according to claim 6, wherein said gelatin has a Bloom value of at least 250.

8. A food product according to claim 1, which comprises, based on the entire product, from 0 to 3 wt.% fat and between 0.05 and 3 wt.% gelatin.

9. A food product according to claim 8, which contains 0.05 to 1.0 wt.% gelatin.

10. A food product according to claim 9, which contains 0.1 to 0.7 wt.% gelatin.

11. A food product according to claim 8, wherein said gelatin has a Bloom value of at least 200.

12. A food product according to claim 11, wherein said gelatin has a Bloom value of at least 250.

13. A food product according to claim 1, which is selected from one of the following products labelled (A), (B), (C) and (D), namely:

(A) a mayonnaise-type dressing which comprises, based on the entire product, from 0 to 40 wt.% fat and from 0.1 to 0.7 wt.% gelatin;

(B) a baked goods pre-baking mix which comprises, based on the entire product, from 0 to 6.5 wt.% fat and from 0.1 to 0.7 wt.% gelatin;

(C) a margarine-type spread which comprises, based on the entire product, from 5 to 20 wt.% fat and from 0.1 to 0.7 wt.% gelatin; and (D) a whipped topping which comprises, based on the entire product, from 0 to 10 wt.% fat and from 0.1 to 0.7 wt.% gelatin.

14. A food product according to claim 13, wherein said gelatin has a Bloom value of at least 200.

15. A food product according to claim 14, wherein said gelatin has a Bloom value of at least 250.

16. A normally fat-containing manufactured food product, wherein all of the fat content therein has been replaced by gelatin in an amount by weight which is no more than 10% of the weight of the original fat content which has been replaced, and wherein the gelatin is a fish-derived gelatin made from fish waste comprising fish skins by a stepwise process including the following steps (i), (ii), (iii) and (iv) carried out in the recited sequence, namely:

(i) treating said fish waste with dilute aqueous alkali, followed by washing with water until the washing water is substantially neutral;

(ii) treating the alkali-treated and washed fish waste from step (i) with dilute aqueous mineral acid, followed by washing with water until the washing water is substantially neutral;

(iii) treating the mineral acid-treated and washed fish waste from step (ii) with dilute aqueous organic acid, followed by washing with water until the washing water is substantially neutral; and (iv) extracting with water at elevated temperatures not above about 55° C., the organic acid-treated and washed fish waste from step (iii).

17. A food product according to claim 16, which product contains gelatin in an amount which lies within the range of from 0.05 to 1.2 wt.% based on the entire product.

18. A food product according to claim 17, which contains gelatin in an amount which lies within the range of from 0.2 to 1.0 wt.%, based on the entire product.

19. A food product according to claim 16, wherein said gelatin has a Bloom value of at least 200.

20. A food product according to claim 19, wherein said gelatin has a Bloom value of at least 250.

21. A food product according to claim 16, which comprises, based on the entire product, between 0.05 and 3 wt.% gelatin.

* * * * *